(12) United States Patent
Jo et al.

(10) Patent No.: US 9,500,277 B2
(45) Date of Patent: *Nov. 22, 2016

(54) HYDRAULIC PRESSURE SUPPLY SYSTEM OF AUTOMATIC TRANSMISSION FOR VEHICLE

(71) Applicant: Hyundai Motor Company, Seoul (KR)

(72) Inventors: Se Hwan Jo, Bucheon-si (KR); Jin Young Hwang, Busan (KR)

(73) Assignee: Hyundai Motor Company, Seoul (KR)

( * ) Notice: Subject to any disclaimer, the term of this patent is extended or adjusted under 35 U.S.C. 154(b) by 104 days.

This patent is subject to a terminal disclaimer.

(21) Appl. No.: 14/520,958

(22) Filed: Oct. 22, 2014

(65) Prior Publication Data

US 2015/0167833 A1 Jun. 18, 2015

(30) Foreign Application Priority Data

Dec. 18, 2013 (KR) .......................... 10-2013-0158824

(51) Int. Cl.
*F16H 61/00* (2006.01)
*F16H 61/478* (2010.01)
(Continued)

(52) U.S. Cl.
CPC ........... *F16H 61/0031* (2013.01); *F04C 14/26* (2013.01); *F16H 57/0441* (2013.01); *F16H 57/0446* (2013.01); *F16H 61/0025* (2013.01); *F16H 61/0028* (2013.01); *F16H 61/0206* (2013.01); *F16H 61/4017* (2013.01); *F16H 61/4061* (2013.01); *F16H 61/478* (2013.01); *F16H 2061/0037* (2013.01);
(Continued)

(58) Field of Classification Search
CPC ........... F16H 61/0031; F16H 61/4017; F16H 61/0441; F16H 61/0446; F16H 61/4061; F16H 41/461; F16H 61/478; F16H 61/0028; F16H 2061/0037; F16H 57/0441; F16H 57/0446; F04C 14/26; Y10T 137/86002; Y10T 137/86139; Y10T 137/86027; Y10T 137/8601

See application file for complete search history.

(56) References Cited

U.S. PATENT DOCUMENTS

| 7,107,870 B2 * | 9/2006 | Kuhstrebe ......... B60W 30/1819 74/335 |
| 2005/0263352 A1 | 12/2005 | Fideler et al. |

(Continued)

FOREIGN PATENT DOCUMENTS

| JP | 10-266978 A | 10/1998 |
| JP | 2001-173575 A | 6/2001 |

(Continued)

*Primary Examiner* — Atif Chaudry
(74) *Attorney, Agent, or Firm* — Morgan, Lewis & Bockius LLP (57) ABSTRACT

A hydraulic pressure supply system of an automatic transmission for a vehicle may include a hydraulic pump receiving oil stored in an oil pan through an input line, generating hydraulic pressure, and discharging the generated hydraulic pressure in the oil through a low-pressure discharge port and a high-pressure discharge port, a first switch valve switching a first switch hydraulic line in order to supply the hydraulic pressure discharged from the low-pressure discharge port of the hydraulic pump selectively to the low pressure portion or the high pressure portion, a second switch valve switching a second switch hydraulic line in order to selectively supply the hydraulic pressure supplied from the first switch valve to the low pressure portion or to return the hydraulic pressure supplied from the first switch valve to the oil pan, a low-pressure regulator valve, and a high-pressure regulator valve.

12 Claims, 4 Drawing Sheets

(51) Int. Cl.
*F16H 61/4061* (2010.01)
*F16H 57/04* (2010.01)
*F04C 14/26* (2006.01)
*F16H 61/4017* (2010.01)
*F16H 61/02* (2006.01)

(52) U.S. Cl.
CPC .. *Y10T 137/8601* (2015.04); *Y10T 137/86002* (2015.04); *Y10T 137/86027* (2015.04); *Y10T 137/86139* (2015.04)

(56) References Cited

U.S. PATENT DOCUMENTS

2008/0035443 A1* 2/2008 De Maziere .......... F16D 25/123
  192/3.57
2010/0281859 A1* 11/2010 Oka .................... E02F 9/2246
  60/459
2011/0173965 A1* 7/2011 Holmes ............... F16H 61/0031
  60/456
2015/0030472 A1* 1/2015 Wi ..................... F16H 61/0025
  417/286

FOREIGN PATENT DOCUMENTS

| | | |
|---|---|---|
| JP | 2006-348794 A | 12/2006 |
| JP | 2012-017802 A | 1/2012 |
| JP | 2012-036861 A | 2/2012 |
| KR | 10-2012-0071429 A | 7/2012 |
| KR | 10-2013-0060044 A | 6/2013 |
| KR | 10-1461894 B1 | 11/2014 |

* cited by examiner

HYDRAULIC PRESSURE SUPPLY SYSTEM OF AUTOMATIC TRANSMISSION FOR VEHICLE

CROSS-REFERENCE TO RELATED APPLICATION

The present application claims priority to Korean Patent Application No. 10-2013-0158824 filed Dec. 18, 2013, the entire contents of which is incorporated herein for all purposes by this reference.

BACKGROUND OF THE INVENTION

1. Field of the Invention

The present invention relates to a hydraulic pressure supply system of an automatic transmission for a vehicle. More particularly, the present invention relates to a hydraulic pressure supply system of an automatic transmission for a vehicle that supplies necessary pressure to a necessary portion by using a mechanical hydraulic pump having a low-pressure discharge port and a high-pressure discharge port, and minimizes driving loss of the hydraulic pump and improves fuel economy by returning unnecessary hydraulic pressure.

2. Description of Related Art

Recently, vehicle makers direct all their strength to improve fuel economy due to worldwide high oil prices and strengthening of exhaust gas regulations.

Improvement of fuel economy may be achieved by improving power delivery efficiency, and the improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Therefore, fuel economy may be improved by minimizing power consumption for driving the hydraulic pump, and noise and vibration may be reduced and durability may be improved by reducing load applied to the hydraulic pump.

In the hydraulic pressure supply system, the low-pressure hydraulic pump and the high-pressure hydraulic pump are driven by one drive shaft, or the low-pressure hydraulic pump is driven by driving torque of an engine and the high-pressure hydraulic pump is driven by driving torque of a motor.

If both of the low-pressure hydraulic pump and the high-pressure hydraulic pump are used, structure of the automatic transmission may be complex and weight may be increased.

In addition, if two hydraulic pumps are used, manufacturing cost may increase and mountability may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of supplying necessary pressure to a necessary portion by using a mechanical hydraulic pump having a low-pressure discharge port and a high-pressure discharge port, and minimizing driving loss of the hydraulic pump and improving fuel economy by returning unnecessary hydraulic pressure.

A hydraulic pressure supply system of an automatic transmission for a vehicle which generates a low hydraulic pressure and a high hydraulic pressure using oil stored in an oil pan and supplies the low hydraulic pressure and the high hydraulic pressure to a low pressure portion and a high pressure portion respectively, may include a hydraulic pump receiving the oil stored in the oil pan through an input line, generating hydraulic pressure, and discharging the generated hydraulic pressure through a low-pressure discharge port and a high-pressure discharge port, a first switch valve switching a first switch hydraulic line in order to supply the hydraulic pressure discharged from the low-pressure discharge port of the hydraulic pump selectively to the low pressure portion or the high pressure portion, a second switch valve switching a second switch hydraulic line in order to selectively supply the hydraulic pressure supplied from the first switch valve to the low pressure portion or to return the hydraulic pressure supplied from the first switch valve to the oil pan, a low-pressure regulator valve regulating the hydraulic pressure supplied from the second switch valve to be stable and supplying the regulated hydraulic pressure to the low pressure portion, and a high-pressure regulator valve regulating the hydraulic pressure supplied from the high-pressure discharge port of the hydraulic pump to be stable, supplying the regulated hydraulic pressure to the high pressure portion, and selectively supplying a portion of the hydraulic pressure supplied from the high pressure discharge port to the low-pressure regulator valve.

An upstream of the first switch valve may be connected to a first low-pressure line connected to the low-pressure discharge port of the hydraulic pump, and a downstream of the first switch valve may be connected to a second low-pressure line and a first bypass line connected to the high-pressure regulator valve.

The first switch valve may be controlled by hydraulic pressure returned from the high-pressure regulator valve and elastic force of a first elastic member counteracting against the returned hydraulic pressure.

An upstream of the second switch valve may be connected to the first switch valve through the second low-pressure line, and a downstream of the second switch valve may be connected to a third low-pressure line and a second recirculation line.

The second switch valve may be controlled by the hydraulic pressure returned from the high-pressure regulator valve and elastic force of a second elastic member counteracting against the returned hydraulic pressure.

The second switch valve may switch the second switch hydraulic line at a higher pressure than the first switch valve switches the first switch hydraulic line.

The low-pressure regulator valve may be connected to the second switch valve through a third low-pressure line, may recirculate a portion of the hydraulic pressure supplied from the third low-pressure line through a first recirculation line to regulate the hydraulic pressure of the third low-pressure line to be stable, and may supply the regulated hydraulic pressure to the low pressure portion.

The first recirculation line may be connected to the input line.

The low-pressure regulator valve may be controlled by the hydraulic pressure supplied to the low pressure portion, and a control pressure of a first solenoid valve and elastic force of a third elastic member counteracting against the hydraulic pressure of the low pressure portion.

The high-pressure regulator valve may recirculate a portion of the hydraulic pressure supplied through a high-pressure line from the high-pressure discharge port of the hydraulic pump through a second recirculation line so as to regulate the hydraulic pressure of the high-pressure line to be stable, and may supply the regulated hydraulic pressure to the high pressure portion and to the low-pressure regulator valve selectively through a second bypass line.

An orifice may be disposed on the second recirculation line, and first and second control pressure lines may be bifurcated from the second recirculation line at an upstream of the orifice so as to supply a control pressure respectively to the first and second switch valves.

The high-pressure regulator valve may be controlled by the hydraulic pressure supplied to the high pressure portion, and a control pressure of a second solenoid valve and elastic force of a fourth elastic member counteracting against the hydraulic pressure of the high pressure portion.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
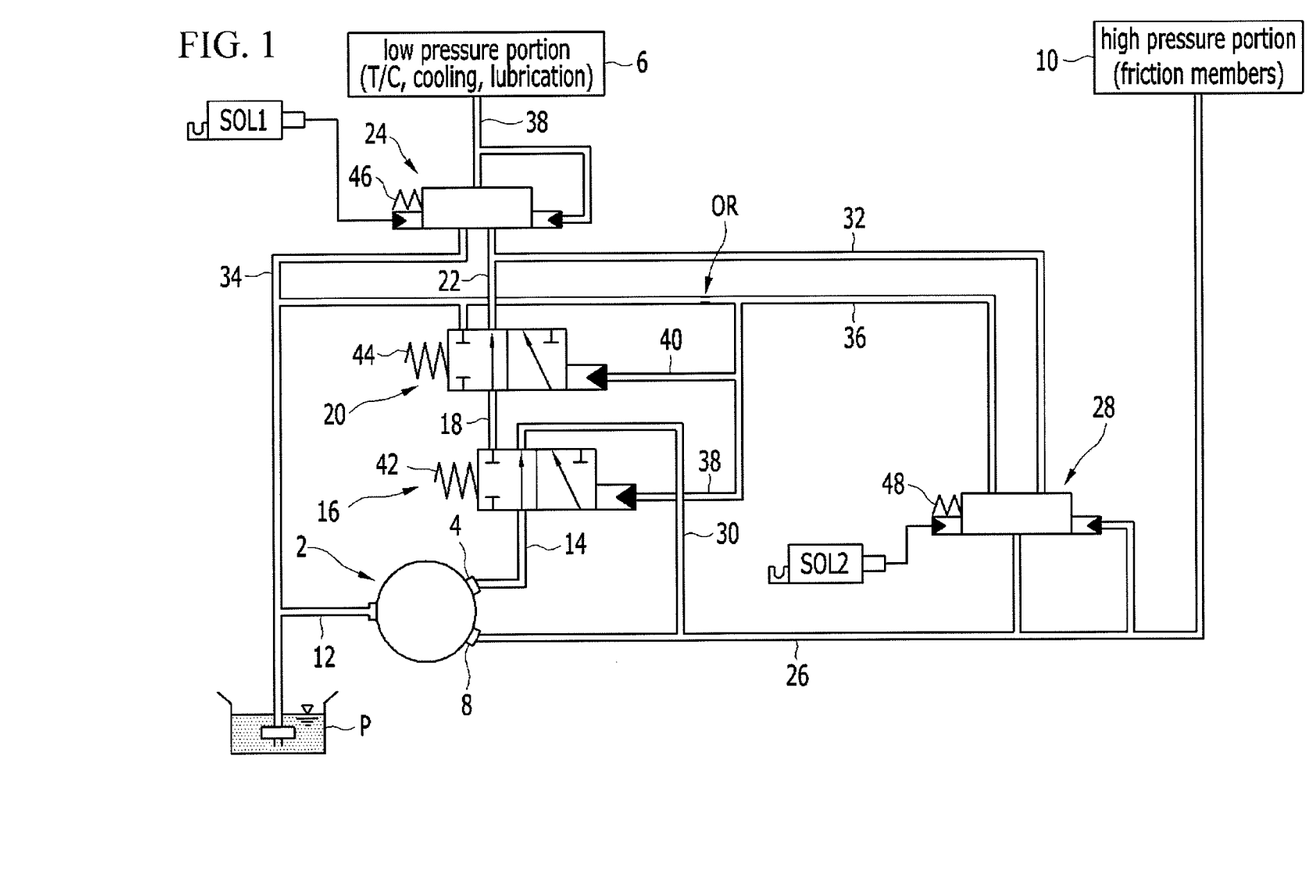
FIG. 1 is a schematic diagram of an exemplary hydraulic pressure supply system according to the present invention.

FIG. 1 is a schematic diagram of a hydraulic pressure supply system according to various embodiments of the present invention.

Referring to FIG. 1, a hydraulic pressure supply system according to various embodiments of the present invention is adapted to supply a low hydraulic pressure discharged through a low-pressure discharge port 4 of a hydraulic pump 2 to a low pressure portion 6 such as a torque converter (T/C), a cooling portion, and a lubrication portion and to supply high hydraulic pressure discharged through a high-pressure discharge port 8 of the hydraulic pump 2 to a high pressure portion 10 for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The low hydraulic pressure discharged through the low-pressure discharge port 4 of the hydraulic pump 2 is supplied to the low pressure portion 6 through a first low-pressure line 14, a first switch valve 16, a second low-pressure line 18, a second switch valve 20, a third low-pressure line 22, and a low-pressure regulator valve 24.

The high hydraulic pressure discharged through the high-pressure discharge port 8 of the hydraulic pump 2 is supplied to the high pressure portion 10 through a high-pressure line 26 and a high-pressure regulator valve 28.

In addition, the low hydraulic pressure discharged through the low-pressure discharge port 4 is selectively supplied to the high pressure portion 10 through a first bypass line 30 connecting the first switch valve 16 to the high-pressure line 26, and a portion of the high hydraulic pressure discharged through the high-pressure discharge port 8 is supplied to the low pressure portion 6 through a second bypass line 32 connecting the high-pressure regulator valve 28 to the third low-pressure line 22.

In addition, a portion of the hydraulic pressure supplied to the low-pressure regulator valve 24 is recirculated to the input line 12 through a first recirculation line 34, and a portion of the hydraulic pressure supplied to the high-pressure regulator valve 28 is recirculated to the input line 12 through a second recirculation line 36 and is supplied to the first and second switch valves 16 and 20 through first and second control pressure lines 38 and 40 as control pressures respectively.

The hydraulic pressure supply system according to various embodiments of the present invention will be described in further detail.

The hydraulic pump 2 is a gear pump that receives oil from an oil pan P through the input line 12 and discharges the oil through two paths, for example through the low-pressure discharge port 4 and the high-pressure discharge port 8. The hydraulic pump 2 is driven by an engine.

The first switch valve 16 is a spool valve and is configured to supply the hydraulic pressure discharged from the low-pressure discharge port 4 selectively to the low pressure portion 6 or the high pressure portion 10.

For this purpose, an upstream of the first switch valve 16 is connected to the first low-pressure line 14 connected to the low-pressure discharge port 4 of the hydraulic pump 2, and a downstream of the first switch valve 16 is connected to the second low-pressure line 18 and the first bypass line 30, In addition, the first switch valve 16 is controlled by a control pressure supplied from the high-pressure regulator valve 28 through the first control pressure line 38 and elastic force of an elastic member 42 counteracting against the control pressure so as to supply the hydraulic pressure supplied from the hydraulic pump 2 through the first low-pressure line 14 selectively to the second low-pressure line 18 or the first bypass line 30.

The second switch valve 20 supplies the hydraulic pressure supplied from the first switch valve 16 to the low-pressure regulator valve 24 until the hydraulic pressure of the high pressure portion 10 reaches a target hydraulic pressure, and returns the hydraulic pressure supplied from the first switch valve 16 to the input line 12 if the hydraulic pressure of the high pressure portion 10 is greater than the target hydraulic pressure.

For this purpose, an upstream of the second switch valve 20 is connected to the second low-pressure line 18 and a downstream of the second switch valve 20 is connected to the third low-pressure line 22 and the second recirculation line 36.

In addition, the second switch valve 20 is controlled by the hydraulic pressure supplied from the high-pressure regulator valve 28 through the second control pressure line 40 and elastic force of the elastic member 44 counteracting against the hydraulic pressure so as to supply the hydraulic pressure supplied from the hydraulic pump 2 through the first low-pressure line 14 and the first switch valve 16 selectively to the third low-pressure line 22 or the second recirculation line 36.

The elastic force of the elastic member 42 used in the first switch valve 16 is smaller than that of the elastic member 44 used in the second switch valve 20.

Therefore, the first and second switch valves 16 and 20 stay at initial positions thereof if the control pressure supplied to the first and second control pressure lines 38 and 40 is smaller than the elastic force of the elastic member 42 used in the first switch valve 16. The first switch valve 16 switches a hydraulic line and the second switch valve 20 stays at the initial position thereof if the control pressure supplied to the first and second control pressure lines 38 and 40 is greater than the elastic force of the elastic member 42 used in the first switch valve 16 and is smaller than the elastic force of the elastic member used in the second switch valve 20. The first and second switch valves 16 and 20 switch hydraulic lines if the control pressure supplied to the first and second control pressure lines 38 and 40 is greater than the elastic force of the elastic member 44 used in the second switch valve 20.

The low-pressure regulator valve 24 regulates the hydraulic pressure supplied from the second switch valve 20 and supplies the regulated hydraulic pressure to the low pressure portion 6.

In addition, the low-pressure regulator valve 24 is controlled by the hydraulic pressure supplied to the low pressure portion 6, and elastic force of an elastic member 46 and a control pressure of a first solenoid valve SOU counteracting against the hydraulic pressure so as to regulate the low hydraulic pressure to be stable, supply the regulated hydraulic pressure to the low pressure portion 6, and recirculate remaining hydraulic pressure to the input line 12 through the first recirculation line 34.

The high-pressure regulator valve 28 regulates the hydraulic pressure supplied from the high-pressure line 26 and supplies the regulated hydraulic pressure to the high pressure portion 10.

In addition, the high-pressure regulator valve 28 is controlled by the hydraulic pressure supplied to the high pressure portion 10, and elastic force of an elastic member 48 and a control pressure of a second solenoid valve SOL2 counteracting against the hydraulic pressure so as to regulate the high hydraulic pressure to be stable, supply the regulated hydraulic pressure to the high pressure portion 10, supply a portion of the regulated hydraulic pressure to the third low-pressure line 22 through the second bypass line 32, and recirculate remaining hydraulic pressure to the input line 12 through the second recirculation line 36.

An orifice OR is disposed on the second recirculation line 36, and the first and second control pressure lines 38 and 40 are bifurcated from an upstream of the orifice OR.

Figure 2:
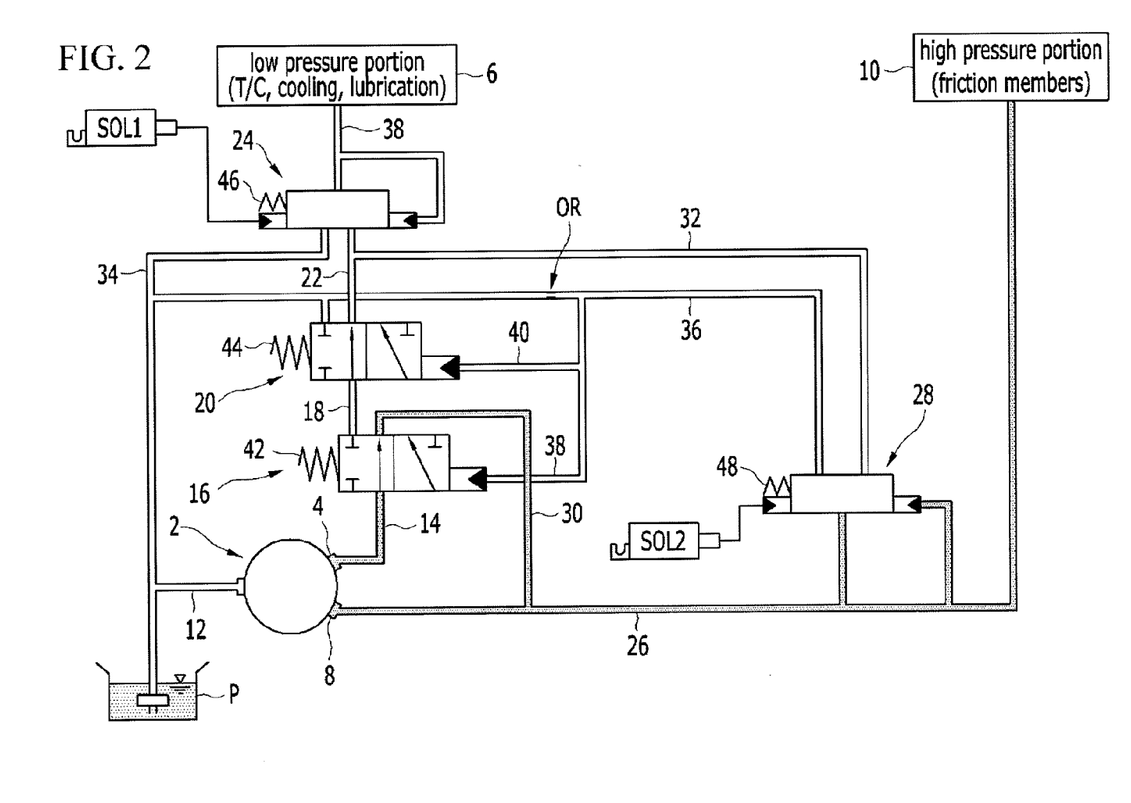
FIG. 2 is a schematic diagram of the exemplary hydraulic pressure supply system illustrating that hydraulic pressure is not sufficiently supplied to a high pressure portion according to the present invention.

FIG. 2 is a schematic diagram of the hydraulic pressure supply system illustrating that hydraulic pressure is not sufficiently supplied to a high pressure portion according to the present invention.

Referring to FIG. 2, hydraulic lines are formed to supply the hydraulic pressure generated by the hydraulic pump 2 to the high pressure portion 10 at an initial starting of the engine.

That is, the first switch valve 16 connects the first low-pressure line 14 to the first bypass 30 and the second switch valve 20 connects the second low-pressure line 18 to the third low-pressure line 22 at the initial starting of the engine.

In this case, the hydraulic pressure discharged through the low-pressure and high-pressure discharge ports 4 and 8 of the hydraulic pump 2 is supplied to the high pressure portion 10 through the high-pressure regulator valve 28.

Therefore, the hydraulic pressure of the high pressure portion 10 can reach a target hydraulic pressure quickly and shift responsiveness may be improved.

At this time, a portion of the hydraulic pressure supplied to the high-pressure regulator valve 28 may be supplied to the low pressure portion 6 through the second bypass line 32.

Figure 3:
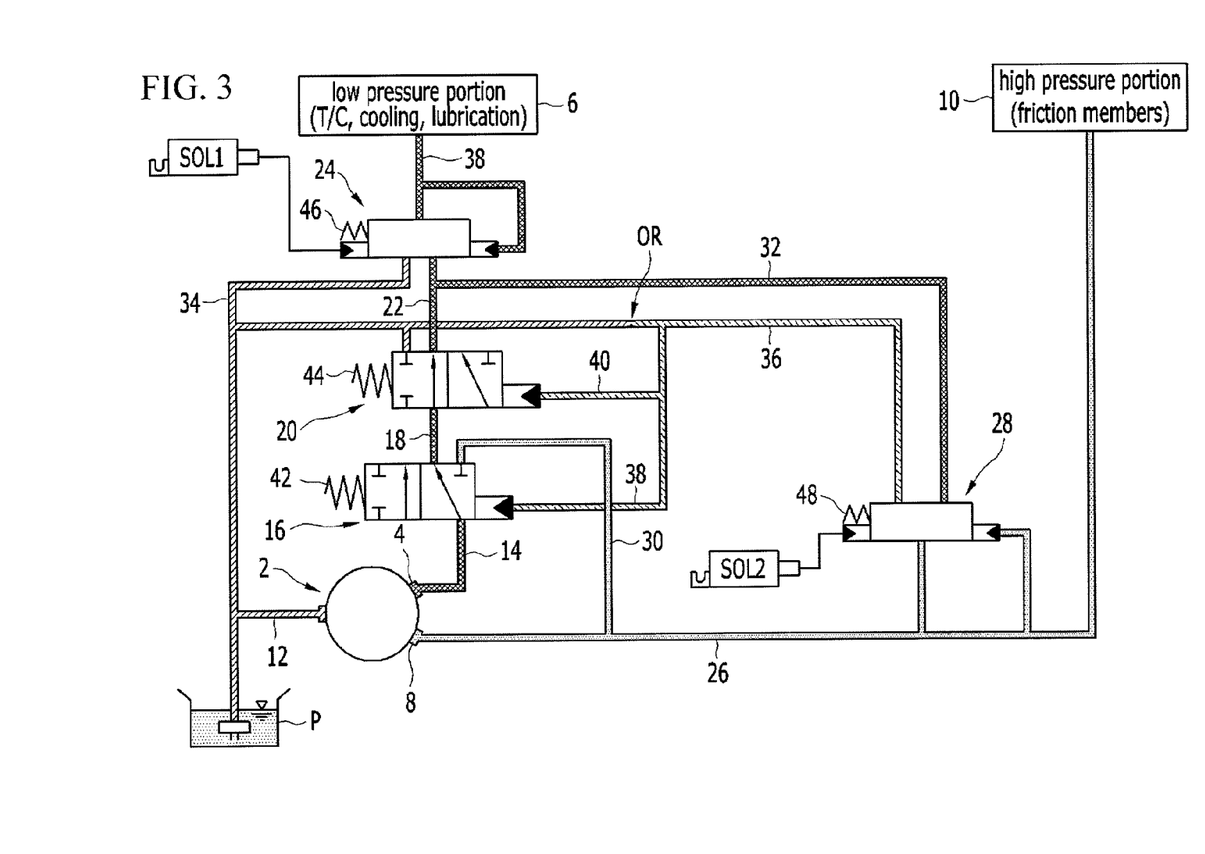
FIG. 3 is a schematic diagram of the exemplary hydraulic pressure supply system illustrating that hydraulic pressure is sufficiently supplied to a high pressure portion according to the present invention.

FIG. 3 is a schematic diagram of the hydraulic pressure supply system illustrating that hydraulic pressure is sufficiently supplied to a high pressure portion according to the present invention.

Referring to FIG. 3, if the hydraulic pressure of the high pressure portion 10 reaches the target hydraulic pressure and the hydraulic pressure of the second recirculation line 36 wins against the elastic force of the elastic member 42 of the first switch valve 16, the first switch valve 16 disconnects the first low-pressure line 14 and the first bypass line 30 and connects the first low-pressure line 14 and the second low-pressure line 18.

In this case, the hydraulic pressure discharged through the low-pressure discharge port 4 is supplied to the low pressure portion 6 through the first and second switch valves 16 and 20 and the low-pressure regulator valve 24, and the hydraulic pressure discharged from the high-pressure discharge port 8 is supplied to the high pressure portion 10.

If the hydraulic pressure of the high pressure portion 10 reaches the target hydraulic pressure, driving torque of the hydraulic pump 2 may be lowered by supplying the hydraulic pressure discharged through the low-pressure discharge port 4 to the low pressure portion 6.

Figure 4:
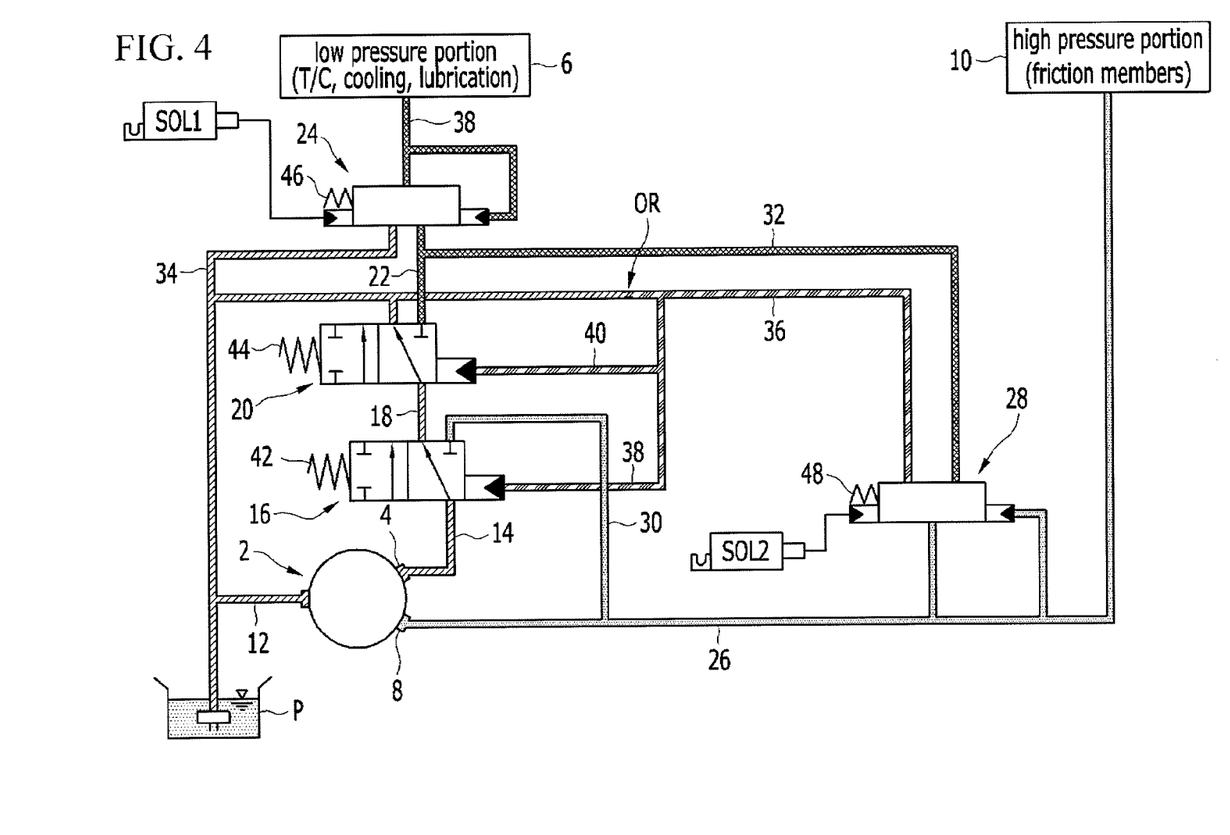
FIG. 4 is a schematic diagram of the exemplary hydraulic pressure supply system illustrating that excessive hydraulic pressure is supplied to a high pressure portion and a low pressure portion according to the present invention.

FIG. 4 is a schematic diagram of a hydraulic pressure supply system illustrating that excessive hydraulic pressure is supplied to a high pressure portion and a low pressure portion according to various embodiments of the present invention.

Referring to FIG. 4, the hydraulic pressure of the high pressure portion 10 is greater than the target hydraulic pressure due to rise of engine speed and the hydraulic pressure of the second recirculation line 36 wins against the elastic force of the elastic member 44 of the second switch valve 20, the second switch valve 20 disconnects the second low-pressure line 18 and the third low-pressure line 22 and connects the second low-pressure line 18 and the second recirculation line 36.

Therefore, the hydraulic pressure discharged through the low-pressure discharge port 4 is returned to the input line 12 through the first and second switch valves 16 and 20 and the second recirculation line 36.

In addition, the hydraulic pressure discharged through the high-pressure discharge port 8 is supplied to the high pressure portion 10 and is supplied to the low pressure portion 6 through the high-pressure regulator valve 28 and the second bypass line 32.

If the hydraulic pressure is excessively supplied to the high pressure portion 10, the hydraulic pressure discharged through the low-pressure discharge port 4 is returned to the input line 12 and the hydraulic pressure discharged through the high-pressure discharge port 4 is supplied to the high pressure portion 10 and the low pressure portion 6. Therefore, capacity of the hydraulic pump 2 may be reduced.

The hydraulic pressure supply system of an automatic transmission according to various embodiments of the present invention may supply the hydraulic pressure to the low pressure portion 6 and the high pressure portion 10 using one hydraulic pump 2 having two discharge ports. Therefore, a layout may be simple, weight may be reduced, and manufacturing cost may be curtailed.

In addition, power loss of the hydraulic pump may be minimized.

In addition, since the hydraulic pressure discharged from the low-pressure discharge port 4 and the high-pressure discharge port 8 is supplied to the high pressure portion 10 at the initial starting, shift responsiveness may be improved.

If the hydraulic pressure is excessively supplied to the high pressure portion 10 due to rise of the engine RPM, the hydraulic pressure discharged through the low-pressure discharge port 4 is returned to the input line 12 (or oil pan) and the hydraulic pressure discharged through the high-pressure discharge port 4 is supplied to the high pressure portion 10 and the low pressure portion 6. Therefore, capacity of the hydraulic pump 2 may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle which generates a low hydraulic pressure and a high hydraulic pressure using oil stored in an oil pan and supplies the low hydraulic pressure and the high hydraulic pressure to a low pressure portion and a high pressure portion respectively, the hydraulic pressure supply system comprising:
   a hydraulic pump receiving the oil stored in the oil pan through an input line, generating hydraulic pressure, and discharging the generated hydraulic pressure in the oil through a low-pressure discharge port and a high-pressure discharge port;
   a first switch valve switching a first switch hydraulic line in order to supply the hydraulic pressure discharged from the low-pressure discharge port of the hydraulic pump selectively to the low pressure portion or the high pressure portion;
   a second switch valve switching a second switch hydraulic line in order to selectively supply the hydraulic pressure supplied from the first switch valve to the low pressure portion or to return the hydraulic pressure supplied from the first switch valve to the oil pan;
   a low-pressure regulator valve regulating the hydraulic pressure supplied from the second switch valve to be stable and supplying the regulated hydraulic pressure to the low pressure portion; and
   a high-pressure regulator valve regulating the hydraulic pressure supplied from the high-pressure discharge port of the hydraulic pump to be stable, supplying the regulated hydraulic pressure to the high pressure portion, and selectively supplying a portion of the hydraulic pressure supplied from the high pressure discharge port to the low-pressure regulator valve.

2. The hydraulic pressure supply system of claim 1, wherein an upstream of the first switch valve is connected to a first low-pressure line connected to the low-pressure discharge port of the hydraulic pump, and a downstream of the first switch valve is connected to a second low-pressure line and a first bypass line connected to the high-pressure regulator valve.

3. The hydraulic pressure supply system of claim 1, wherein the first switch valve is controlled by hydraulic pressure returned from the high-pressure regulator valve and elastic force of a first elastic member counteracting against the returned hydraulic pressure.

4. The hydraulic pressure supply system of claim 1, wherein an upstream of the second switch valve is connected to the first switch valve through a second low-pressure line, and a downstream of the second switch valve is connected to a third low-pressure line and a second recirculation line.

5. The hydraulic pressure supply system of claim 1, wherein the second switch valve is controlled by hydraulic pressure returned from the high-pressure regulator valve and elastic force of a second elastic member counteracting against the returned hydraulic pressure.

6. The hydraulic pressure supply system of claim 1, wherein the second switch valve switches the second switch hydraulic line at a higher pressure than the first switch valve switches the first switch hydraulic line.

7. The hydraulic pressure supply system of claim 1, wherein the low-pressure regulator valve is connected to the second switch valve through a third low-pressure line, recirculates a portion of the hydraulic pressure supplied from the third low-pressure line through a first recirculation line to regulate the hydraulic pressure of the third low-pressure line to be stable, and supplies the regulated hydraulic pressure to the low pressure portion.

8. The hydraulic pressure supply system of claim 7, wherein the first recirculation line is connected to the input line.

9. The hydraulic pressure supply system of claim 1, wherein the low-pressure regulator valve is controlled by the hydraulic pressure supplied to the low pressure portion, and a control pressure of a first solenoid valve and elastic force of a third elastic member counteracting against the hydraulic pressure of the low pressure portion.

10. The hydraulic pressure supply system of claim 1, wherein the high-pressure regulator valve recirculates a portion of the hydraulic pressure supplied through a high-pressure line from the high-pressure discharge port of the hydraulic pump through a second recirculation line so as to regulate the hydraulic pressure of the high-pressure line to be stable, and supplies the regulated hydraulic pressure to the high pressure portion and to the low-pressure regulator valve selectively through a second bypass line.

11. The hydraulic pressure supply system of claim 10, wherein an orifice is disposed on the second recirculation line, and first and second control pressure lines are bifurcated from the second recirculation line at an upstream of the orifice so as to supply a control pressure respectively to the first and second switch valves.

12. The hydraulic pressure supply system of claim 1, wherein the high-pressure regulator valve is controlled by the hydraulic pressure supplied to the high pressure portion, and a control pressure of a second solenoid valve and elastic force of a fourth elastic member counteracting against the hydraulic pressure of the high pressure portion.

* * * * *